June 11, 1963    L. P. FLATLAND    3,092,908
ASPIRATING DENTAL DRILL
Filed July 20, 1959    2 Sheets-Sheet 1
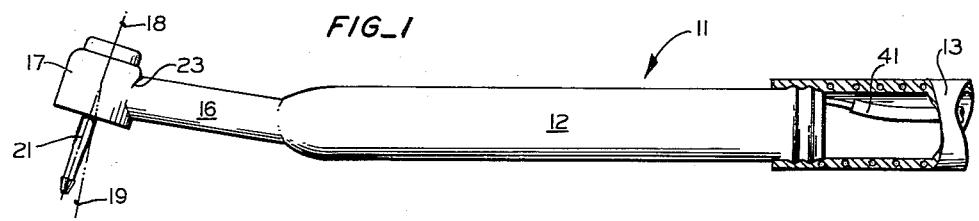
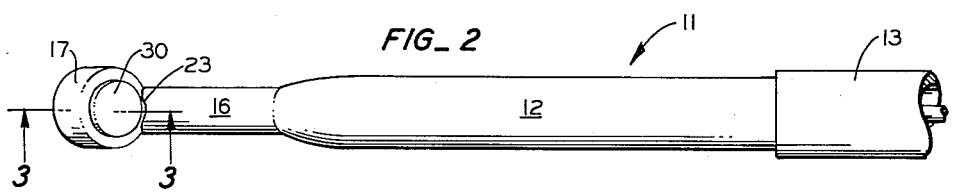
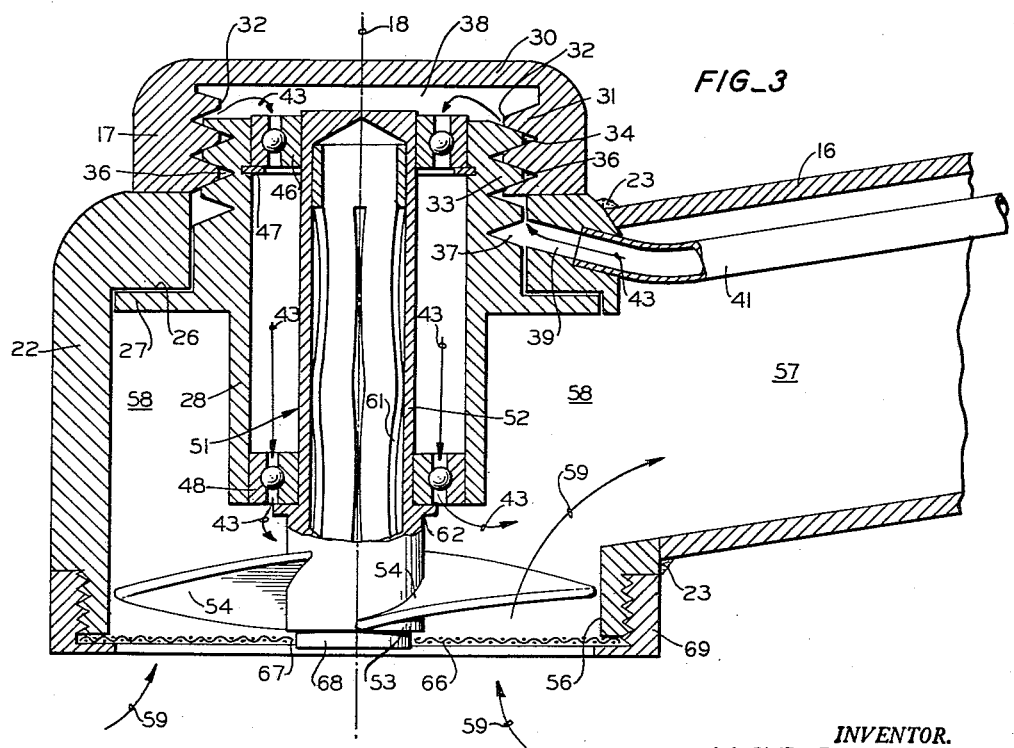
INVENTOR.
LLOYD P. FLATLAND
BY Lothrop & West
ATTORNEYS June 11, 1963 L. P. FLATLAND 3,092,908
ASPIRATING DENTAL DRILL
Filed July 20, 1959 2 Sheets-Sheet 2
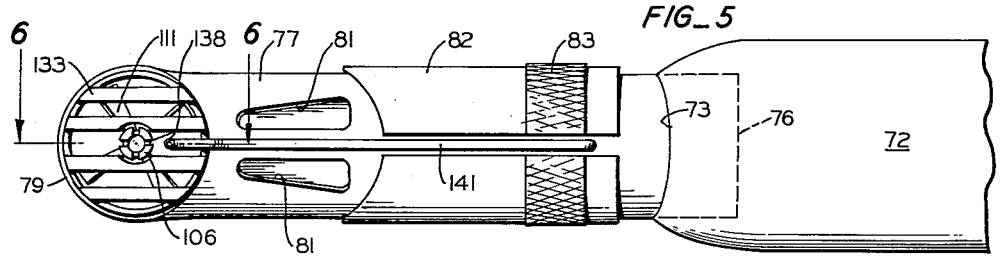
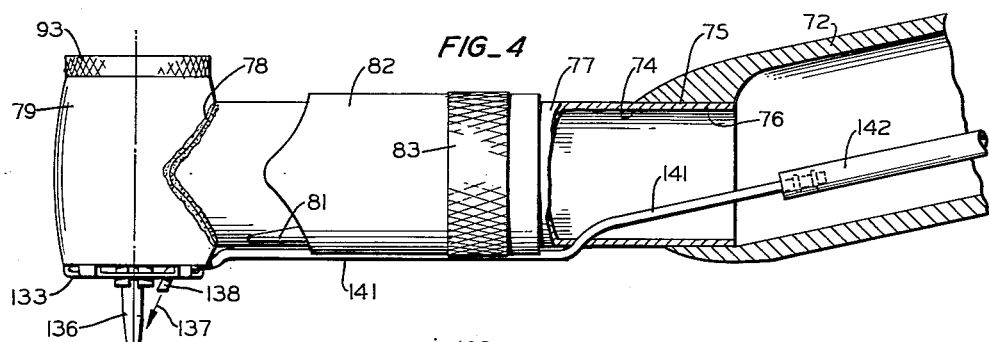
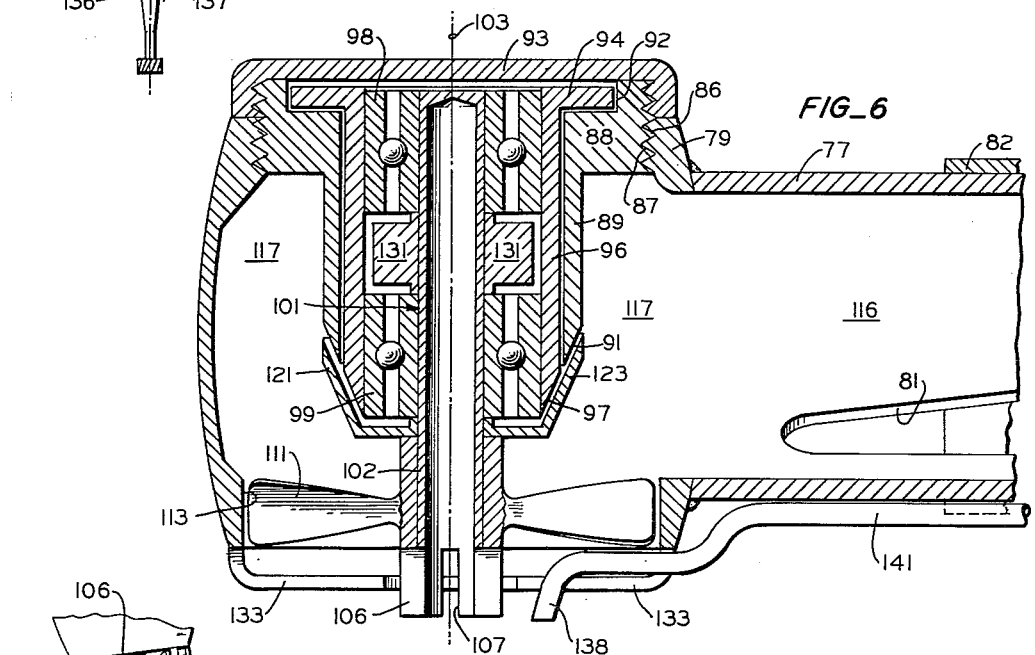
INVENTOR.
LLOYD P. FLATLAND
BY Lothrop & West
ATTORNEYS

United States Patent Office 3,092,908
Patented June 11, 1963

3,092,908
ASPIRATING DENTAL DRILL
Lloyd P. Flatland, 462 Gonzalez Drive,
San Francisco, Calif.
Filed July 20, 1959, Ser. No. 828,175
8 Claims. (Cl. 32—27)

The invention relates to ultra high speed dental drills and, more particularly, to a high speed dental drill which aspirates from the area being drilled.

The latter years have witnessed rapid advances in the art of high speed dental drills. Dental air turbines, despite certain disadvantages, including the need for a pressurized air source and connections, the expulsion of oil in the oral cavity, and a generally undesirable hygienic environment, are in wide use.

Likewise coming into ever greater favor is the high volume dental aspirator, a vacuum device which aspirates or draws air in large volume away from the oral area in which the dentist is working. Here again, there are disadvantages such as the need to locate the aspirating instrument, or suction tube, fairly near to the area being worked yet out of the line of the dentist's vision. Quite frequently, a large portion of a dental nurse's or dental assistant's time is consumed in manipulating and holding the aspirator in just the right position.

It is therefore an object of the invention to provide a high speed dental drill which in itself serves as an aspirator.

It is another object of the invention to provide a dental drill in which aspiration occurs precisely at the location desired at all times.

It is yet another object of the invention to provide a dental drill which eliminates the need for a separate additional tool, or device, such as the aspirator heretofore used to be inserted into an already cluttered mouth, and which frees the time of a dental assistant for other more important tasks than holding and adjusting the position of an aspirator.

It is still another object of the invention to provide a dental drill in which a stream of fluid, such as water, or air, or moisture spray, is directed into the area being drilled, regardless of the position of the drill, and in which the water, air, or spray is thereupon immediately withdrawn by aspiration from the area, along with entrained detritus, and replaced by the clean water, air, or spray stream continuously issuing from the jet.

It is a further object of the invention to provide a dental drill which rotates at an extremely high speed.

It is yet a further object of the invention to provide a high speed dental drill which operates in a substantially noiseless and vibration-free manner, the levels being so low as to be not discernible for all practical purposes.

It is still a further object of the invention to provide a dental drill which can be powered, or actuated, by virtue of the vacuum created by the aspirator machinery already owned by many dentists.

It is yet a further object of the invention to provide a vacuum powered dental drill which exerts a substantial torque on the dental cutting and excavating instrument.

It is still another object of the invention to provide a dental drill whose speed can be nicely controlled by movement of a valve located immediately adjacent the drilling head and which is therefore highly convenient and which, when opened to reduce speed, increases aspiration.

It is yet another object of the invention to provide a very high speed drill which does not require a source of compressed air and costly attachments and connections related thereto.

It is a further object of the invention to provide a dental drill comparable in configuration to the standard contra-angle but which enables a dentist quickly to adjust and regulate the orientation and angularity of the offset knee portion, thus enabling the dentist to approach the working area from the most convenient direction.

It is still another object of the invention to provide a combined high speed drill and aspirating head which has but few moving parts, is light and highly maneuverable, and which can readily be put to use in any dental office having an aspirator or other vacuum source.

It is a further object of the invention to provide a dental drill which is powered by a vacuum and which concurrently utilizes the vacuum as an aspirating device.

It is another object of the invention to provide a generally improved high speed dental drill.

Other objects, together with the foregoing, are attained in the embodiments described in the following description and shown in the accompanying drawings, in which:

FIGURE 1 is a side elevational view of one form of the drill, a portion of the connecting hose to the aspirating equipment being shown in section;

FIGURE 2 is a top plan view of the form of device shown in FIGURE 1;

FIGURE 3 is a section of the drilling head, to an enlarged scale, the plane of section being indicated by the line 3—3 in FIGURE 2;

FIGURE 4 is a side elevational view of a preferred form of drill, a portion of the knee, or angle piece, and a portion of the sheath being shown in section to reveal the face-to-face engagement therebetween, the collar valve being shown in partly open position;

FIGURE 5 is a bottom view of the form of device shown in FIGURE 4, but with the collar valve in fully open position, and with the bur and chuck removed for clarity of disclosure;

FIGURE 6 is a section, to an enlarged scale, the plane of section being indicated by the line 6—6 in FIGURE 5; and FIGURE 7 is a partly idealized representation of a section of a tooth being worked on, showing how the water jet and the aspirated air cooperate in the drilling operation.

While the dental drill of the invention is susceptible of numerous physical embodiments, depending upon the environment and requirements of use, substantial numbers of the herein shown and described embodiments have been made, used and exhaustively tested, and all have performed in an eminently satisfactory manner.

Referring at this time to the form of device shown in FIGURES 1-3, it can be seen that a dental drill of the invention, generally designated by the numeral 11, includes an elongated hollow sheath 12, or handle, adapted at one end to be connected to a vacuum or collapse-resistant type of hose 13 leading to a conventional high volume dental aspirating machine (not shown) or other source of vacuum.

Mounted on the other end of the sheath 12 is a hollow angle piece 16, or knee, or knee extension, or knee-to-head section, the longitudinal axis of the knee being, for example, at an angle of about twelve degrees with respect to the longitudinal axis of the sheath.

Mounted in turn on the end of the knee 16 is a generally cylindrical drilling head 17. In the usual dental angle, the drilling head is at right angles to the knee portion. In the form of device shown, however, the axis 18 of the drilling head is five degrees off the perpendicular line 19 to the axis of the knee 16, so that a bur 21, for example, whose rotational axis is coincident with the head axis 18, is inclined forwardly away from the perpendicular line 19. It has been found that greater flexibility of use can be obtained where the angularity of the bur with respect to the sheath is obtained in these two steps rather than in the one large step of seventeen or so degrees which has heretofore been widely used.

Furthermore, the two step construction helps to some extent in providing a free passageway for the vacuum-induced movement of air from a location adjacent the bur 21, thence into the drilling head 17 and back through the sheath 12 and hose 13 to the aspirating machinery.

With particular reference to FIGURE 3, it can be seen that the drilling head 17 comprises a generally cylindrical body 22, or housing, suitably attached, as by welding 23, to the knee 16. A downwardly facing annular shoulder 26 on the housing receives in face-to-face engagement an annular flange 27 extending laterally from a drum 28.

The drum 28 is fastened to the housing by screwing downwardly a cap 30 having interior threads 31 whose peaks, or teeth, are bobbed, as at 32. The cap threads 31 engage with exterior threads 33 formed on the upper portion of the drum 28. The exterior thread teeth are also bobbed, as at 34.

The effect of the mutual bobbing of the thread teeth is to define a helical passageway 36 beginning at a lower V-shaped helical recess 37 in the drum and extending helically upwardly to a chamber 38 defined by the cap 30 and the upper end of the drum. Discharging into a port 39 formed in the drill head body is an oil mist carried by a tubing 41 extending through the sheath 12 and the hose 13 and ultimately terminating at a conventional small-capacity lubricator (not shown). Such lubricators are of well-known design and their operation is to insert a metered quantity of lubricating oil into an air line under a predetermined air pressure. The quantity of oil is so small as to involve only a thin film or mist type of lubrication.

As an alternative, not shown, a conventional oil reservoir, from which oil is drawn through a tube to the head by reason of the vacuum within the head, can be used.

The oil and air mixture moves in the paths generally indicated by the arrows 43, the flow being helically upwardly to the chamber 38, thence downwardly through an upper anti-friction bearing 46 held by a snap retainer 47, and through a lower anti-friction bearing 48, the oil mist serving to lubricate the bearings.

Rotatably mounted in the inner races of the bearings is a member termed a chuck and generally designated by the numeral 51. The chuck 51 not only includes a hollow spindle 52, or sleeve, but also a hub 53 coaxially mounted on the lower end of the spindle and provided with a plurality of blades 54.

The envelope of the blades substantially spans or extends over the entire circular opening 56 at the bottom end of the housing 22. Consequently, when a vacuum is impressed on the hollow interior 57 of the knee 16 and thus on the substantially hollow interior 58 of the drilling head, air flow occurs in the general pattern indicated by the arrows 59, the movement of the air, in impinging on the blades, effecting a very high rotational velocity of the chuck 51 of the order of 350,000 r.p.m.

Frictionally disposed within the sleeve 52, or spindle, is illustrated a form of bur holder 51 adapted frictionally to receive and hold the shank of any of the conventional bur instruments. The particular kind of holder shown forms no part of the instant invention and a number of other forms are equally suitable, reference being had, for example, to certain of my copending applications relating to bur holders.

A slinger ring 62 is preferably mounted on the outside of the spindle immediately below the lower bearing 48. While the flow of the oil mist 43 as it leaves the lower bearing is ordinarily adequate to prevent the entry into the bearings of debris entrained in the air stream 59, the slinger 62 completes the effectiveness, and by a localized fan or pumping action causes the air stream 59 and entrapped detrital particles to veer away from the bearing race.

It is deemed advisable, for protective purposes, to add a screen 66, or grill, to cover the circular opening 56 below the blades, an opening 67 in the center of the screen permitting a downward extension 68 of the bur chuck. Conveniently, an interiorly threaded base cap 69 engageable with corresponding threads adjacent the bottom of the housing is used to clamp the grill in place.

It can therefore be seen that not only is the chuck caused to rotate by air movement induced by the interior vacuum, but the air flow in itself serves to aspirate or draw air away from the area below and in the vicinity of the drill opening. The aspirating influence reaches, or extends, or makes itself felt for a surprising distance from the drilling head, and clearly so adjacent the area in which the bur is working. Consequently, cutting debris, moisture and all the other unwanted material adjacent the excavation are immediately swept away, and the same force which effects this desirable result also serves to effect rotation of the cutting instrument itself.

Reference is now had to the preferred form of device shown in FIGURES 4–7. In this form, a hollow sheath 72 is connected at one end to a vacuum source (not shown), such as a high volume dental aspirator. The other end of the sheath is exteriorly tapered; and its interior walls extend inwardly from the opening 73 to form a cylindrical chamber 74 defined by walls 75, the axis of the chamber being inclined at an angle of approximately twelve degrees from the axis of the sheath. The degree of angularity chosen might for some purposes be varied between twelve and seventeen degrees.

Adapted to fit very snugly through the circular opening 73 and in the chamber 74 is the circular cylindrical shank 76 of a hollow knee 77. As can be visualized, the knee 77 can be rotated so that the head is inclined, within limits, to any desired degree of angularity with respect to the sheath, the limits being defined by the respective axes of the knee and the sheath. The dentist is thereby given a freedom or flexibility of angularity not possible with the handpieces and contra-angles heretofore utilized. The relatively tight fit between the walls 75 of the sheath opening and the shank of the knee, and the interior vacuum which obtains, both serve to prevent separation between the two elements.

The knee 77 extends forwardly and has suitably mounted thereon, as by a weldment 78, a hollow drilling head 79 which, for aerodynamic reasons, is somewhat barrel-like in shape.

Formed on the bottom wall portion of the knee 77 is a pair of symmetrically located apertures 81, or bleeder valve ports, increasing in size as they recede from the drilling head. Adapted selectively to cover and uncover these ports is a valve collar 82 closely encircling the underlying walls of the knee. A knurled portion 83 formed on the collar enables the dentist to slide the collar forwardly and backwardly over the ports 81 either to fully cover or to fully expose them, or to effect any desired intermediate degree of opening. When the ports are fully covered, the vacuum within the drilling head is at its maximum; when the ports are fully exposed, the vacuum within the drilling head is substantially destroyed since atmospheric air bleeds inwardly through the ports. Intermediate degrees of vacuum within the drilling head are achieved by partial uncovering. If desired, the ports 81 can be formed so that the extent or amount of their opening, as uncovering proceeds, is to a logarithmic or exponential scale so that, for example, a movement of the collar through two-thirds of its translational range from fully closed to fully open position will effect a corresponding decrease in vacuum in the head, namely, by approximately two-thirds of its maximum.

The barrel-shaped drilling head 79, as can be seen most clearly in FIGURE 6, is provided adjacent its upper end with an interiorly threaded portion 86 adapted to engage with the exterior threads 87 on the enlarged head 88 of a drum 89, the lower margin or periphery of the drum being tapered as at 91.

An annular recess 92 is formed in the top of the enlarged drum head 88. Confined within the recess 92, with a vertical freedom of movement of about 0.001 inch, by a cap 93 threaded on the threads 87 is a transverse annular flange 94. From the flange 94 depends an elongated vertical sleeve 96 having its bottom margin 97 tapered in sloping alignment with the drum margin 91.

The outer races of an upper anti-friction bearing 98 and a lower anti-friction bearing 99 are mounted within the sleeve 96. Mounted, in turn, within the inner races of the bearings is a rotatable member termed generally a chuck and designated by the numeral 101.

The chuck 101 includes a vertical spindle portion 102 whose axis of rotation 103 is substantially coincident with the axis of the drilling head. The spindle 102 is hollow and serves to receive the shank of the conventional bur. At its lower end, the spindle is enlarged to form what is termed a jaw section 106, or bushing, the jaw section being split into a plurality of segments by slits 107, the jaw being heat-treated to provide a resilient frictional clamping effect on the encompassed portion of a bur's shank.

Immediately above the jaw 106 is a plurality of blades 111 extending radially from a hub 112 formed on the spindle. The blade envelope substantially spans the downwardly facing circular opening 113 at the bottom of the drilling head. Thus, as the vacuum within the knee chamber 116 and the head chamber 117 makes its influence felt to the atmosphere outside the head opening 113, air flow through the opening occurs. This air movement causes the blades 111 to revolve. Preferably, the blades are fabricated with predetermined airfoil sections for greatest efficiency.

As the blades revolve, so rotates the spindle, carrying with it a slinger 121, the slinger including a transverse annular plate 122 mounted on the spindle and extending outwardly past the lower bearing 99, and upturned adjacent its periphery to form a conical plate 123 covering and extending to the outer margin of the tapered portion 91 of the drum 89. This construction assures a very substantial protection to the bearings 98 and 99 as well as to the sleeve 96, and is aerodynamically very satisfactory in guiding the incoming air with a minimum of turbulence.

Aerodynamic considerations are also involved in proportioning the volume within the head chamber 117 with respect to the cross-section of the knee chamber 116 so as to assure optimum air flow efficiency. The barrel shape of the head helps to provide a sufficient cross-section within the head chamber 117 to avoid constriction of air flow as the air departs from the blades and moves toward the knee chamber 116, thence through the sheath 72 to the vacuum source.

While the elements of the chuck 101 can be designed to achieve a certain degree of flywheel or inertia effect, it has been found that an additional element, termed an inertia member 131, is of considerable help. The inertia member 131 takes the form of a disc or sleeve interposed between the upper and lower bearings, the disc being mounted on the spindle 102 as by an interference fit. The member should have a high specific gravity, should be relatively hard and should be inert. Gold, alloyed to increase its hardness, has been found to serve in an admirable fashion as the material to be used.

Covering the opening 113 at the bottom of the drill head is a protective grillwork 133, an opening in the center of the grill serving to permit the projection therethrough of the chuck jaw portion 106, or bushing.

As can be seen most clearly in FIGURES 4 and 7, a conventional bur 136 is retained by and extends downwardly from the chuck bushing. Cooperating closely with the rotational motion of the bur 136 and being favorably acted upon by the air movement upwardly in the vicinity of the bur is a stream of water, indicated by the arrow 137, issuing as a jet from a nozzle 138. The water is delivered by a small diameter water tube 141 mounted on the bottom surface of the knee and extending into the interior of the knee where it connects with a water supply tubing 142 communicating with any suitable water source. It is apparent that air or an air-water spray could also be utilized.

The nozzle 138 extends partially across the diameter of the head opening 113 and is directed so that the stream is parallel to the axis of bur rotation and flows very close to the bur shank.

Owing to this parallelism and the slight conical divergence of the stream, the stream of water impinges against the bur, as appears most clearly in FIGURE 7. Assisted by the rotation of the bur and the flow of the air in the vicinity, the stream of water flows downwardly and covers all sides of the bur, and into the area 151 of the tooth 152 being excavated. Then, upon entraining or entrapping the debris at the bottom of the excavation 153, the powerful air flow induced by the aspirator "picks up" or "sucks up," in effect, the water, and the attendant debris, and impels them upwardly through the head opening 113 and onwardly to the aspirator itself. Replacing the water and debris removed by the air flow is clean water emitted by the nozzle 138, the stream flow being substantially continuous, thus resulting in a continuous cleansing action.

It can be seen, in other words, that not only is the bur-paralleling jet of water highly effective in placing the water accurately in a location where it does the most good, but the aspirating influence in the same vicinity serves most effectively to keep the area free of debris and under constant unobstructed observation by the dentist.

While in both of the described forms the vacuum induced by an aspirator has also served to rotate the chuck, it is to be clearly recognized that, if desired, the chuck can also be rotated by a belt, water, gear, or even a pressurized air drive, or by an electrical drive, using high frequency current, for example, without substantially interfering with the principle of aspirating through the drilling head itself. However, the utilization of an aspirator-induced air current as the bur-rotating force and as the force continuously removing moisture and debris from the oral cavity and from an excavation represents a preferred combination of extraordinary simplicity, utility and compactness. Lastly, the utilization of a vacuum rather than a compressed air system provides a much cleaner and more hygienic and sanitary environment in the area being worked on, there being no contamination by lubricating oil or by reason of compressor operation.

What is claimed is:

1. A dental drill comprising: an elongated hollow sheath adapted to be connected at one end with a vacuum hose, said sheath having at the other end a circular opening and adjacent said opening a hollow cylindrical portion defined by inwardly extending cylindrical interior walls; a hollow elongated knee having at one end right circular cylindrical walls adapted to fit snugly through said circular opening at said other end of said sheath and to engage in face to face relation with said cylindrical interior walls of said sheath; a collar slidably mounted on said knee and adapted to move selectively between a first position wherein an aperture in said knee is fully covered by said collar and a second position wherein said aperture isf ully exposed; a hollow drilling head mounted on the other end of said knee; means on said drilling head for directing the movement of air induced by a vacuum in said hose from the atmosphere outside said drilling head to a location within said drilling head; and a drill-holding chuck rotatably mounted within said drilling head, said chuck including air-flow responsive means for rotating said chuck, said air-flow-responsive means being located within the path of air movement determined by said air-directing means.

2. A vacuum powered dental drill comprising: an elongated hollow conduit connected at one end to a vacuum source; a hollow substantially cylindrical drilling head mounted on the other end of said conduit, said head including a housing having an opening at one end thereof; a chuck rotatably mounted on said housing and coaxially therewith, said chuck extending through said opening in said end of said housing; a plurality of blades mounted on said chuck adapted to be revolved by the vacuum-induced movement of air through said opening and into said head; a grillwork extending over said opening in said end of said drilling head; and a fluid ejecting nozzle mounted on said head, said nozzle being directed away from said head.

3. A vacuum powered dental drill comprising: an elongated hollow conduit connected at one end to a vacuum source; a hollow substantially cylindrical drilling head mounted on the other end of said conduit, said head including a housing having an opening at one end thereof; a chuck rotatably mounted on said housing and coaxially therewith, said chuck extending through said opening in said end of said housing; a plurality of blades mounted on said chuck adapted to be revolved by the vacuum-induced movement of air through said opening and into said head; a grillwork extending over said opening in said end of said drilling head; an inertia member on said chuck, said member including a symmetrically configured structure of heavy, relatively inert material encompassing said chuck; and a fluid ejecting nozzle mounted on said head, said nozzle being directed away from said head.

4. A vacuum powered dental drill comprising: an elongated hollow conduit connected at one end to a vacuum source; a hollow substantially cylindrical drilling head mounted on the other end of said conduit, said head including a housing having an opening at one end thereof; a chuck rotatably mounted on said housing and coaxially therewith, said chuck extending through said opening in said end of said housing; said chuck being adapted to rotate within a pair of spaced anti-friction bearings on said head, said bearings being lubricated by lubricating means including an oil-air mist carried from a lubricator to said bearings through a tubing disposed within said hollow conduit and directed into said drilling head; a plurality of blades mounted on said chuck adapted to be revolved by the vacuum-induced movement of air through said opening and into said head; a grillwork extending over said opening in said end of said drilling head; an inertia member on said chuck, said member including a symmetrically configured structure of heavy, relatively inert material encompassing said chuck; and a fluid ejecting nozzle mounted on said head, said nozzle being directed away from said head.

5. An aspirating dental drill comprising:
   a. A hollow, substantially cylindrical drilling head having a first opening located at one end of said head and a second opening located on one side of head;
   b. a dental bur chuck coaxially mounted for rotation within said drilling head, said chuck extending toward said first opening;
   c. a plurality of air-flow-responsive blades mounted on said chuck, said blades being disposed substantially in the plane of said first opening;
   d. means for inducing a vacuum adjacent said second opening whereby atmospheric air outside said head and adjacent said first opening is caused to flow through said first opening and to rotate said air-flow-responsive blades and said chuck;
   e. a conduit having one end connected with said second opening and the other end connected with said vacuum-inducing means, said conduit having formed therein a third opening adjacent said drilling head, said third opening being in close juxtaposition to said first opening; and,
   f. means for selectively covering and uncovering said third opening.

6. An aspirating dental drill comprising: a hollow substantially cylindrical drilling head having a circular opening at one end; a dental bur chuck coaxially mounted for rotation within said head and extending toward said opening; a plurality of blades mounted on said chuck adjacent the end of said chuck adjacent said opening, said blades forming, during rotation, a circular envelope substantially spanning said opening; means for inducing a vacuum within said head; and a grillwork substantially covering said opening whereby air flow created by said vacuum inducing means moves through said grillwork and impinges on said blades.

7. The device of claim 6 further characterized by a drum coaxially mounted in said head and surrounding said chuck; a pair of anti-friction bearings mounted within said drum and supporting said chuck; and a slinger member on said chuck spaced slightly from and substantially covering the outer race of the one of said pair of bearings proximate to said blades.

8. The device of claim 7 further characterized by a relatively inert and heavy inertia member mounted symmetrically on said chuck for rotation therewith.

References Cited in the file of this patent

UNITED STATES PATENTS

| 983,988 | Foster et al. | Feb. 15, 1911 |
| 2,703,904 | De Long | Mar. 15, 1955 |
| 2,866,267 | Fletcher et al. | Dec. 30, 1958 |

FOREIGN PATENTS

| 612,807 | France | Aug. 9, 1926 |